US008435332B2

(12) United States Patent
Christie et al.

(10) Patent No.: US 8,435,332 B2
(45) Date of Patent: May 7, 2013

(54) OXYGEN SEPARATION MODULE AND APPARATUS

(75) Inventors: Gervase Maxwell Christie, Amherst, NY (US); David M. Reed, Richland, WA (US); Jerrine L. Neff, Williamsville, NY (US); Arthur C. Selover, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 276 days.

(21) Appl. No.: 13/082,899

(22) Filed: Apr. 8, 2011

(65) Prior Publication Data

US 2012/0255443 A1 Oct. 11, 2012

(51) Int. Cl.
*B01D 53/22* (2006.01)

(52) U.S. Cl.
USPC ............... 96/8; 95/45; 95/54; 96/7; 96/10; 204/640

(58) Field of Classification Search ........... 95/45, 54; 96/7, 8, 10; 204/640
See application file for complete search history.

(56) References Cited

U.S. PATENT DOCUMENTS

| 3,282,803 | A | * | 11/1966 | Poepel et al. | 436/34 |
|---|---|---|---|---|---|
| 4,175,153 | A | * | 11/1979 | Dobo et al. | 428/398 |
| 5,169,506 | A | * | 12/1992 | Michaels | 204/242 |
| 5,302,258 | A | * | 4/1994 | Renlund et al. | 205/634 |
| 5,417,101 | A |   | 5/1995 | Weich | |
| 5,750,279 | A | * | 5/1998 | Carolan et al. | 429/456 |
| 5,820,654 | A | * | 10/1998 | Gottzman et al. | 95/54 |
| 5,820,655 | A | * | 10/1998 | Gottzmann et al. | 95/54 |
| 6,592,731 | B1 | * | 7/2003 | Lawless | 204/425 |
| 7,833,314 | B2 | * | 11/2010 | Lane et al. | 95/54 |
| 8,323,378 | B2 | * | 12/2012 | Swami et al. | 95/22 |
| 8,349,214 | B1 | * | 1/2013 | Kelly et al. | 252/373 |
| 2005/0058871 | A1 | * | 3/2005 | Li et al. | 429/30 |
| 2005/0263405 | A1 | * | 12/2005 | Jacobson et al. | 205/619 |
| 2010/0076280 | A1 |   | 3/2010 | Bernstein et al. | |
| 2010/0116133 | A1 | * | 5/2010 | Reed et al. | 95/79 |
| 2010/0116680 | A1 |   | 5/2010 | Reed et al. | |

* cited by examiner

*Primary Examiner* — Jason M Greene
*Assistant Examiner* — Anthony Shumate
(74) *Attorney, Agent, or Firm* — Robert J. Hampsch (57) ABSTRACT

A module and an apparatus incorporating such module utilizing a plurality of tubular membrane elements, each configured to separate oxygen from an oxygen containing feed stream when an electric potential difference is applied to induce oxygen ion transport in an electrolyte thereof. The tubular membrane elements can be arranged in a bundle that is held in place by end insulating members. The insulating members can be positioned within opposed openings of end walls of a heated enclosure and can incorporate bores to allow an oxygen containing feed stream to flow past exposed ends of the tubular membrane elements for cooling the end seals of such elements. Further, first and second manifolds can be provided in a module in accordance with the present invention to collect separated oxygen from two separate portions of the tubular membrane elements.

6 Claims, 5 Drawing Sheets

OXYGEN SEPARATION MODULE AND APPARATUS

FIELD OF THE INVENTION

The present invention relates to an oxygen separation module and apparatus that incorporates a plurality of tubular membrane elements, each configured to separate oxygen from an oxygen containing feed stream when an electric potential difference is applied to produce oxygen ion transport through an electrolyte of the tubular membrane elements. More particularly, the present invention relates to such an oxygen separation module and apparatus in which manifolds to collect the separated oxygen are positioned at opposite ends of the tubular membrane elements and are connected to the tubular membrane elements such that a portion of the tubular membrane elements are connected to one of the manifolds and another portion of the tubular membrane elements are connected to the other of the manifolds.

BACKGROUND OF THE INVENTION

Electrically driven oxygen separators are used to separate oxygen from oxygen containing feed, for example, air. Additionally, such devices are also used in purification application where it is desired to purify an oxygen containing feed by separating oxygen from the feed. The device can also be configured to separate H2O into H2 and O2 or CO2 into CO and O2. Electrically driven oxygen separators can utilize tubular membrane elements having a layered structure containing an electrolyte layer capable of transporting oxygen ions when subjected to an elevated temperature, cathode and anode electrode layers located at opposite surfaces of the electrolyte layer and current collector layers to supply an electrical current to the cathode and anode electrode layers.

When the tubular membrane elements are subjected to the elevated temperature, the oxygen contained in a feed will ionize on one surface of the electrolyte layer, adjacent the cathode electrode layer by gaining electrons from an applied electrical potential. Under the impetus of the applied electrical potential, the resulting oxygen ions will be transported through the electrolyte layer to the opposite side, adjacent the anode layer and recombine into elemental oxygen.

The tubular membrane elements are housed in an electrically heated containment to heat the tubular membrane elements to an operational temperature at which oxygen ions will be transported. Additionally, such tubular membrane elements can be manifolded together such that the oxygen containing feed is passed into the heated containment and the separated oxygen is withdrawn from the tubular membrane elements through a manifold. In certain purification applications, the oxygen containing feed can be passed through the interior of the tubular membrane elements and the separated oxygen can be withdrawn from the containment.

Typical materials that are used to form the electrolyte layer are yttrium or scandium stabilized zirconia and gadolinium doped ceria. The electrode layers can be made of mixtures of the electrolyte material and a conductive metal, a metal alloy or an electrically conductive perovskite. Current collectors in the art have been formed of conductive metals and metal alloys, such as silver as well as mixtures of such metals and metallic oxides.

The tubular membrane elements can be contained in one or more modules in which in each module, the tubular membrane elements are arranged in bundles and are held in place by end insulation members adjacent to the opposite ends of the tubular membrane elements. These modules can be positioned within insulated, heated enclosures to heat the tubular membrane elements to an operational temperature at which oxygen ion transport can occur. The insulated enclosure also has inlets and outlets within end walls of the enclosure to allow an oxygen containing feed stream to be passed into the enclosure and thereby to contact the tubular membrane elements. As a result of the oxygen separation, a retentate stream is formed that is discharged from the enclosure through the outlet. This type of electrically driven oxygen separation device is shown in U.S. Patent Application Publication No. 2010/0116680 A1.

As can be appreciated, it is important that electrically driven oxygen separation devices reliably deliver the oxygen and at the lowest cost possible. With respect to reliability, a major problem with electrically driven oxygen separation devices, is that failure of the tubular membrane elements can occur. As a result, the oxygen containing feed stream will pass through the point of failure in a particular tubular membrane and little if any oxygen will be separated by the membrane that has the defect. Since, a major advantage of supplying oxygen from an electrically driven oxygen separation device is that the oxygen can be produced at ultra-high purity, the defective tubular membrane element will result in an unacceptable decrease in purity of the oxygen product. Therefore, as a result of such failure, the electrically driven oxygen separation device will have to be removed from service. Furthermore, such a device is most useful if the outlet of oxygen separation modules are connected to a storage tank and the oxygen is stored at pressure. In the case of a tube failure, the stored oxygen in the tank will discharge through the fractured ceramic tube. In order to reduce costs, the electrically driven oxygen separator has to be assembled in a cost efficient manner. In the patent application discussed above, the use of modules of such elements coupled with polymeric end seals go a long way toward reducing assembly costs. However, such ends seals represent another possible point of failure because they have only a limited ability to withstand the high temperatures that are necessary to induce the oxygen ion transport in the tubular membrane elements.

As will be discussed, the present invention provides a module and an electrically driven oxygen separation device that, among other advantages is capable of operating upon failure of one or more tubular membrane elements and that is specifically designed to cool the end seals.

SUMMARY OF THE INVENTION

The present invention provides, in one aspect, a module for an electrically driven oxygen separator that incorporates a plurality of tubular membrane elements. Each of the tubular membrane elements is configured to separate oxygen from an oxygen containing feed stream when an electric potential difference is applied to induce oxygen ion transport in an electrolyte thereof. A first manifold and a second manifold, configured to collect the oxygen, are spaced apart from one another with the tubular membrane elements situated between the first manifold and the second manifold. The first and second manifold are connected to the tubular membrane elements such that oxygen is received by the first manifold from a first portion of the tubular membrane elements and by the second manifold from a second portion of the tubular membrane elements.

Therefore, upon failure of at least one of the tubular membrane elements in either the first portion or the second portion of the tubular membrane elements, oxygen is able to be collected from either the first portion or the second portion of the tubular membrane elements that do not include the at least one of the tubular membrane elements that has failed. Check valves can be provided to pneumatically isolate the failed tube and associated first or second tubular membrane elements. While the oxygen will of course be delivered at a lower rate after such a failure, unlike electrically driven oxygen separators of the prior art, the failure of one or more elements will not necessarily result in the electrically driven oxygen separator being withdrawn from service.

End seals can be located at opposite ends of the tubular membrane elements. Each of the first manifold and the second manifold have a collection element to collect the oxygen produced by the tubular elements and first and second elongated elements connected at one end to the collection element and at the other end penetrating the end seals at the opposite ends of the tubular membrane elements. The first of the elongated elements are of tubular configuration to conduct the oxygen and the second of the elongated elements are configured to prevent flow of the oxygen to the collection element of each of the first manifold and the second manifold. The first of the elongated elements alternating with the second of the elongated elements such that as between two adjacent tubular membrane elements, the oxygen flows from one of the two adjacent tubular membrane elements to the collection element of the first manifold and from the other of the two adjacent tubular membrane elements to the collection element of the second manifold. The second of the elongated elements can be of solid configuration.

The end seals can comprise plug-like members located within the tubular membrane element and formed by an elastomer to produce hermetic seals at the opposite ends of the tubular membrane elements and deposits of a ceramic adhesive located within the tubular membrane elements adjacent to the plug-like members and positioned to prevent outward movement of the plug-like members. The tubular membrane elements can be arranged in a bundle and are held in place by two opposed end insulation members located adjacent to the opposed ends of the tubular membrane elements. In such case, each of the first manifold and the second manifold has a spider-like configuration with the first and the second elongated elements radiating from the collection element of each of the first manifold and the second manifold. Further, each of the two opposed end insulation members has an inlet opening for passage of the oxygen containing feed stream.

Each of the tubular membrane elements has an inner anode layer, an outer cathode layer and an electrolyte layer located between the anode layer and the cathode layer to form the electrolyte. Two current collector layers are located adjacent to and in contact with the anode layer and the cathode layer and situated on the inside and outside of the tubular membrane element to allow the electrical potential to be applied by a power source. The tubular membrane elements can be connected in series and contain current distributors of helical configuration in contact with one of the two current collector layers on the inside of the tubular membrane elements to conduct an electrical current applied by electrical conductors passing through the feed throughs.

In another aspect, the present invention provides an electrically driven oxygen separation apparatus. Such apparatus is provided with an enclosure having two inlet regions, a heated interior region located between the inlet regions and having opposed end walls positioned adjacent to the inlet regions, opposed openings defined in the end walls, a sidewall connecting the end walls and heating elements positioned to heat the heated interior region. An outlet extends from the heated interior region and through the sidewall. A plurality of tubular membrane elements are provided that are each configured to separate oxygen from an oxygen containing feed stream when an electric potential difference is applied to induce oxygen ion transport in an electrolyte thereof. End seals are located at opposite ends of the tubular membrane elements.

The tubular membrane elements are arranged in a bundle and held in place by two opposed end insulation members located adjacent to the opposed ends of the tubular membrane elements. The bundle is positioned within the enclosure and with the end insulation members situated within the openings of the end walls and the opposed ends of the tubular membrane elements and the end seals thereof projecting outwardly from the end insulation members and into the two inlet regions. At least one manifold is connected to the tubular membrane elements and configured to collect the oxygen produced by the tubular membrane elements. Inlets are located within the two end insulation members for passage of two oxygen containing feed streams from the inlet regions to the heated interior region and two blowers connected to the two inlet regions to circulate the oxygen containing feed stream into the inlet region and past the end seals to cool the end seals and then, through the inlets, thereby to contact the membrane elements inside the heated enclosure and to discharge a heated retentate from the heated enclosure that is formed by separation of the oxygen from the oxygen containing feed stream. The cooling of the end seals help to prevent failure of the electrically driven oxygen separator in the first instance.

As set forth above, the at least one manifold can be a first manifold and a second manifold spaced apart from one another with the tubular membrane elements situated between the first manifold and the second manifold. The first manifold and the second manifold are connected to the tubular membrane elements such that oxygen is received by the first manifold from a first portion of the tubular membrane elements and by the second manifold from a second portion of the tubular membrane elements. Upon failure of at least one of the tubular membrane elements in either the first portion or the second portion of the tubular membrane elements, oxygen is able to be collected from either the first portion or the second portion of the tubular membrane elements that do not include the at least one of the tubular membrane elements that has failed.

Each of the first manifold and the second manifold can be provided with a collection element to collect the oxygen produced by the tubular elements and first and second elongated elements connected at one end to the collection element and at the other end penetrating the end seals at the opposite ends of the tubular membrane elements. The first of the elongated elements are of tubular configuration to conduct the oxygen and the second of the elongated elements are configured to prevent flow of the oxygen to the collection element of each of the first manifold and the second manifold. The first of the elongated elements alternate with the second of the elongated elements such that as between two adjacent tubular membrane elements, the oxygen flows from one of the two adjacent tubular membrane elements to the collection element of the first manifold and from the other of the two adjacent tubular membrane elements to the collection element of the second manifold.

The end seals can comprise plug-like members located within the tubular membrane element and formed by an elastomer to produce hermetic seals at the opposite ends of the tubular membrane elements and deposits of a ceramic adhesive located within the tubular membrane elements adjacent to the plug-like members and positioned to prevent outward movement of the plug-like members. As indicated above, the cooling of such end seals has proven to be critical for preventing failure of the electrically driven oxygen separation device. The second of the elongated elements can be of solid configuration. Each of the first manifold and the second manifold has a spider-like configuration with the first and the second elongated elements radiating from the collection element of each of the first manifold and the second manifold.

Each of the membrane elements has an inner anode layer, an outer cathode layer and an electrolyte layer located between the anode layer and the cathode layer to form the electrolyte. Two current collector layers are located adjacent to and in contact with the anode layer and the cathode layer and situated on the inside and outside of the tubular membrane element to allow the electrical potential to be applied by a power source. The tubular membrane elements can be connected in series and the tubular membrane elements can contain current distributors of helical configuration in contact with one of the two current collector layers on the inside of the tubular membrane elements to conduct an electrical current applied by electrical conductors passing through the feed throughs.

BRIEF DESCRIPTION OF THE DRAWINGS

While the specification concludes with claims that distinctly point out the subject matter that Applicants regard as their invention, it is believed that the invention will be understood when taken in connection with the accompanying drawings in which:

DETAILED DESCRIPTION

Figure 1:
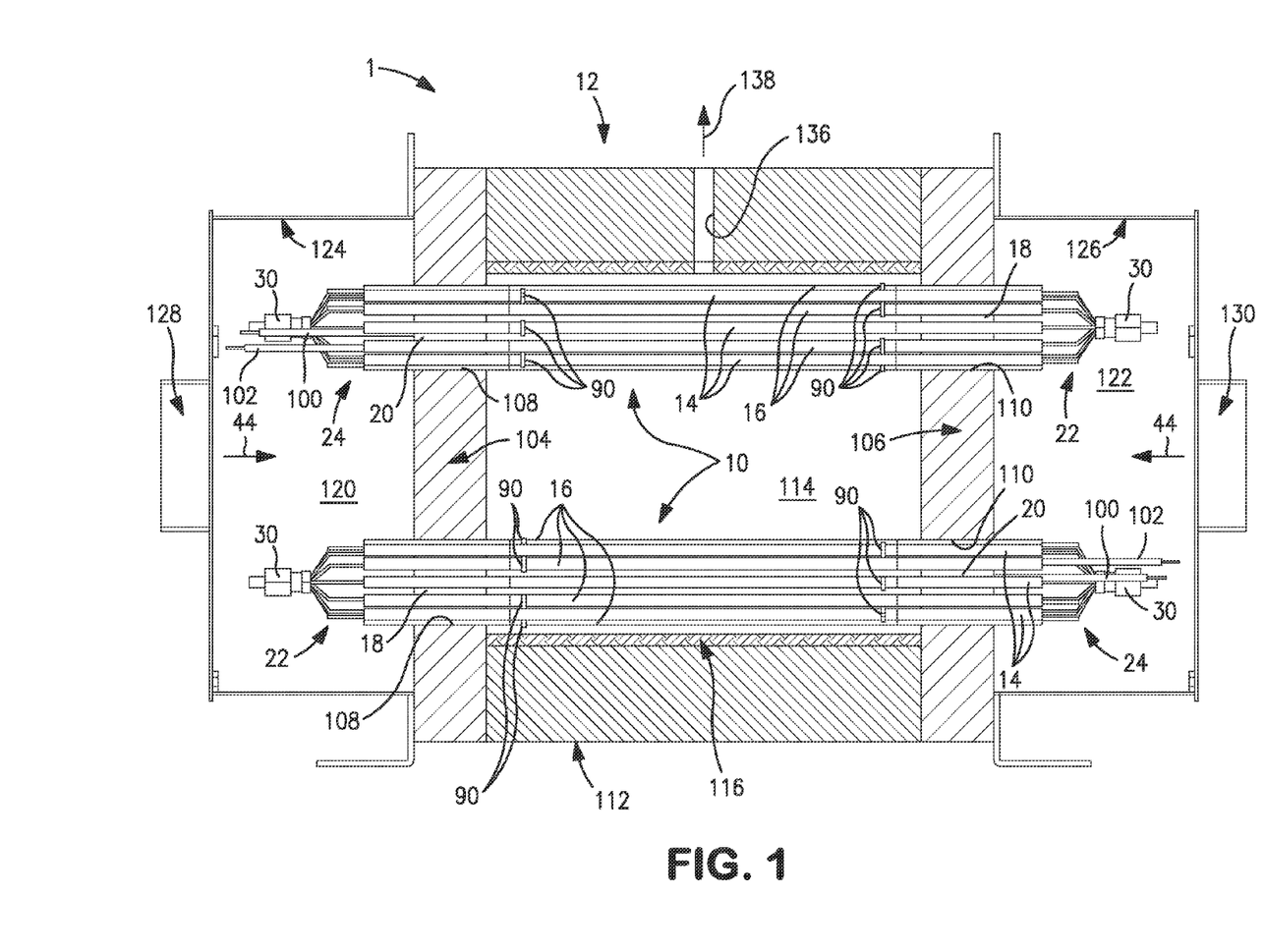
FIG. 1 is a schematic sectional view of an electrically driven oxygen separation apparatus of the present invention.

With reference to FIG. 1, an electrically driven oxygen separator 1 of the present invention is illustrated that has two modules 10 housed within an enclosure 12. It is understood that there could be more or fewer modules 10 depending upon the application of an oxygen separation in accordance with the present invention.

Figure 2:
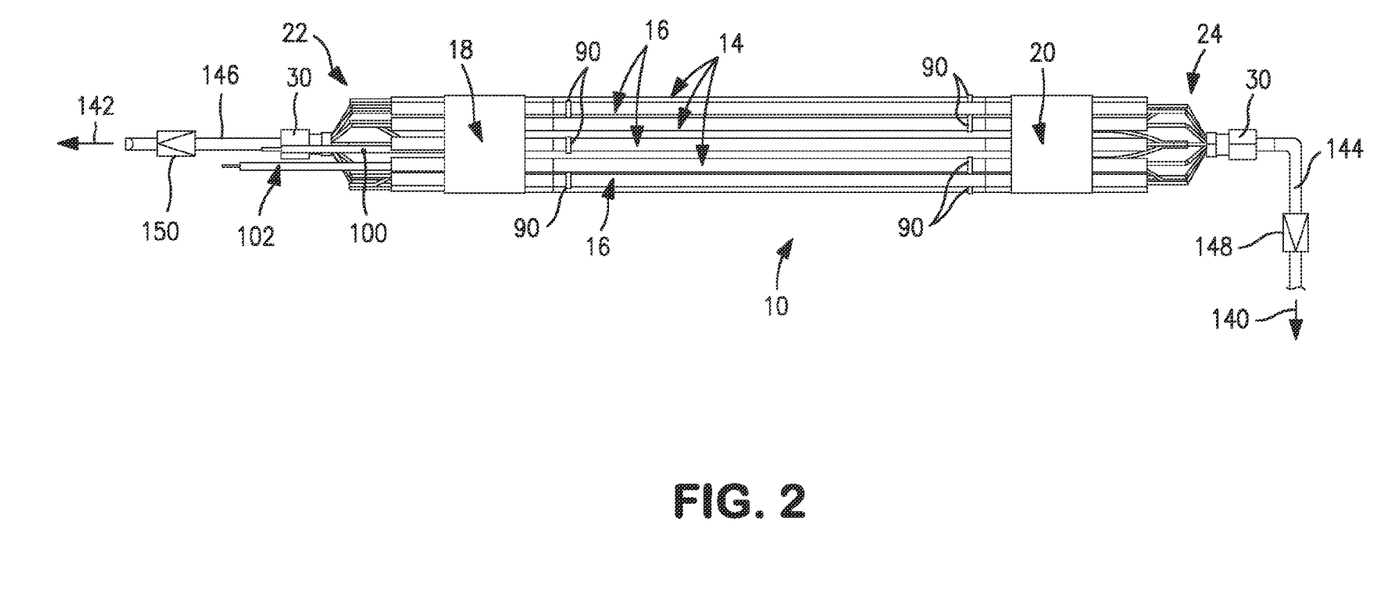
FIG. 2 is an elevational view of a module of the present invention.

With reference to FIG. 2, each of the module 10 are formed by a bundle of tubular membrane elements that are divided into a first portion of the tubular membrane elements 14 and a second portion of the tubular membrane elements 16. The first and second portions of the tubular membrane elements are held in position by end insulation members 18 and 20 that are fabricated from high purity alumina fiber. The tubular membrane elements for exemplary purposes can have an outer diameter of about 6.35 mm., a total wall thickness of about 0.5 mm. and a length of about 55 cm. The oxygen that is separated by such first and second portions of the tubular membrane elements 14 and 16 are collected by first and second manifolds 22 and 24 that as illustrated are spaced apart from one another with the first and second portions of the tubular membrane elements 14 and 16 located between the first and second manifolds 22 and 24.

Figure 3:
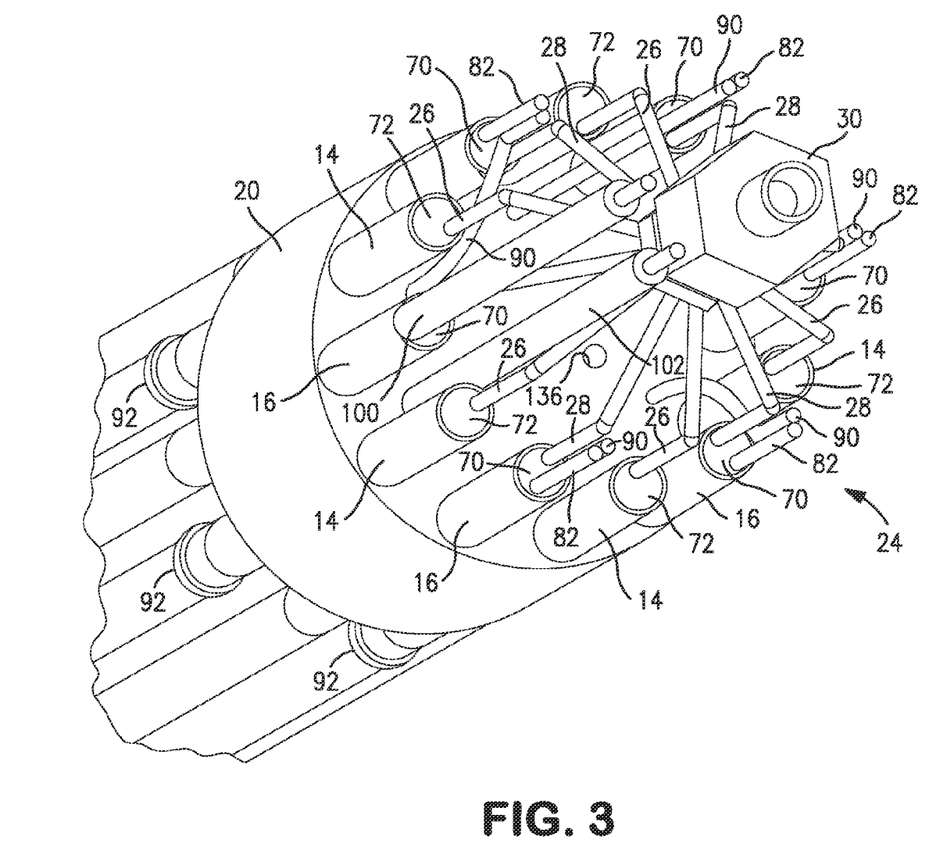
FIG. 3 is an enlarged, fragmentary perspective view of the module shown in FIG. 2.

The first and second manifolds 22 and 24 are connected to the first and second portions of the tubular membrane elements 14 and 16 such that oxygen is received by the first manifold 22 from the first portion of the tubular membrane elements 14 and by the second manifold 24 from the second portion of the tubular membrane elements 16. With additional reference to FIG. 3, the connection of the first manifold 22 is illustrated. Each of the first and second manifolds 22 and 24 are provided with first elongated elements 26 and second elongated elements 28 that radiate in a spider-like arrangement from a collection element 30 that actually collects the oxygen that is separated by the first and second portions of the tubular membrane elements 14 and 16. As illustrated, the first portion of the tubular membrane elements 14 alternate with the second portion of the tubular membrane elements 16 and the elongated elements 26 alternate with the elongated elements 28. The elongated elements penetrate the end seals 70 and 72 provided in opposite ends of both of the first and second portions of the tubular elements 14 and 16. The first elongated elements 26 are hollow tubes and the second elongated elements 28 are of solid configuration, although such elongated elements 28 could be hollow tubes that are plugged. In any case, since the first elongated elements 26 are hollow tubes, the oxygen will flow from the first portion of the tubular membrane elements 14 to the collection element 30 while the oxygen will not flow from the second portion of the tubular membrane elements 16 to the collection elements 30. At the opposite end of the module 10, however, the second manifold 24, that is identical to the first manifold 22, is slightly rotated such that the first elongated elements 26 penetrate the end seals 72 of the second portion of the tubular membrane elements 16 and the second elongated elements 28 penetrate the end seals 70 of the first portion of the tubular membrane elements 16. As a result, the oxygen produced by the second portion of the tubular membrane elements 16 is collected by the collection element of the second manifold 24. Consequently, if one or more of the first portion of the tubular membrane elements 14 fail, oxygen will still able to be produced, albeit at a lower flow rate, from the second portion of the tubular membrane elements 16 that have not failed and vice-versa.

As can be appreciated, it is possible to construct an embodiment of the present invention in which there is no such alternation of tubular membrane elements and elongated elements. For example the first portion of the tubular membrane elements 14 could be located on one side and the second portion of the tubular membrane elements 16 could be located on the other side of the module. In such case, the first elongated elements 14 would be located one side of the module 10 and the second elongated elements 16 would be located on the opposite side. Furthermore, embodiments of the present invention are also possible in which the tubular membrane elements are located in the same plane. As can be appreciated, the manifold in such case would have an elongated collection element with elongated elements extending therefrom at right angles to penetrate the end seals of the tubular membrane elements. In any embodiment, the tubular membrane elements are divided into portions such that one manifold will conduct the oxygen from one portion and the other manifold will conduct oxygen from the other portion.

Figure 4:
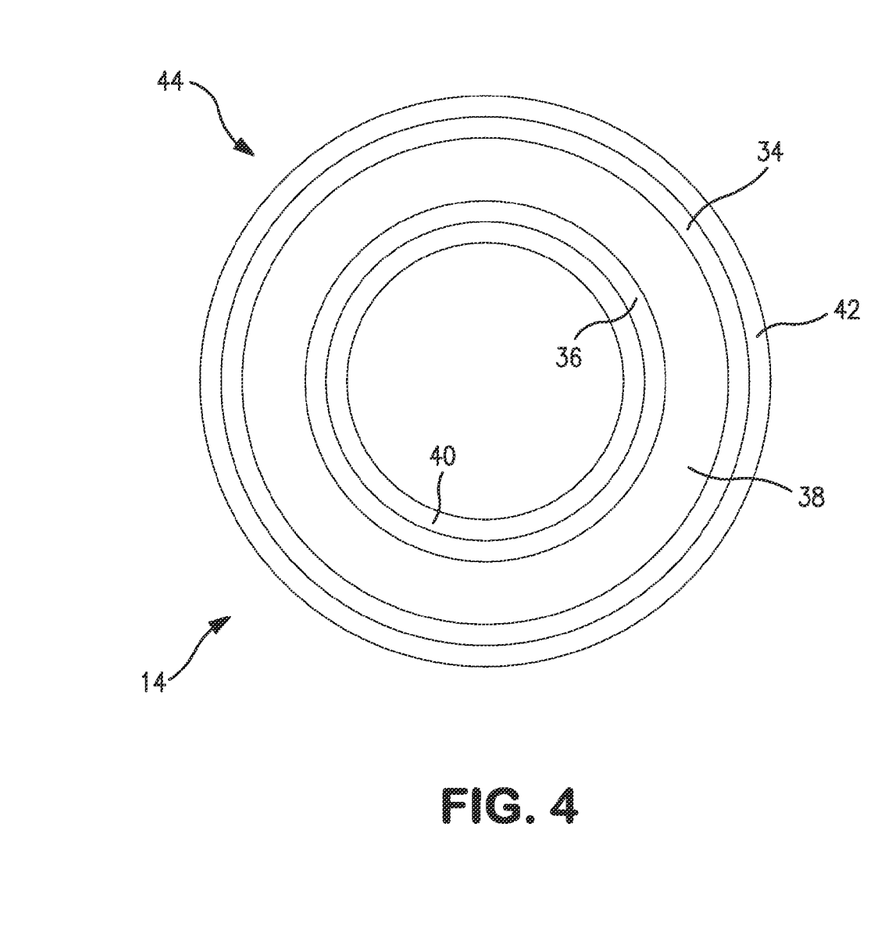
FIG. 4 is a schematic, transverse cross-sectional view of a tubular membrane element used in a module of the present invention.

With additional reference to FIG. 4, each of the tubular membrane elements 14 is provided with a cathode layer 34, an anode layer 36 and an electrolyte layer 38. Two current collector layers 40 and 42 are located adjacent the anode layer 36 and the cathode layer 34, respectively, to conduct an electrical current to the anode layer and the cathode layer. Tubular membrane elements 16 are identical to tubular membrane elements 14. Although the present invention has application to any composite structure making up a tubular membrane element 14, for exemplary purposes, the cathode layer 36 and the anode layer 34 can be between about 10 and about 50 microns thick and the electrolyte layer 38 can be between about 10 microns and about 1 mm. thick, with a preferred thickness of about 500 microns. The electrolyte layer 38 is gas impermeable and can be greater than about 95 percent dense and preferably greater than 99 percent dense. Each of the cathode layer 36 and the anode layer 34 can have a porosity of between about 30 percent and about 50 percent and can be formed from $(La_{0.8}Sr_{0.2})_{0.98}MnO_{3-\delta}$. The electrolyte layer 38 can be 6 mol % scandium oxide, 1 mol % cerium oxide doped zirconium oxide. The current collector layers 40 and 42 can each be between about 50 and about 150 microns thick, have a porosity of between about 30 percent and about 50 percent and can be formed from a powder of silver particles having surface deposits of zirconium oxide. Such a powder can be produced by methods well known in the art, for example by wash-coating or mechanical alloying. For exemplary purposes, a silver powder, designated as FERRO S7000-02 powder, can be obtained from Ferro Corporation, Electronic Material Systems, 3900 South Clinton Avenue, South Plainfield, N.J. 07080 USA. The size of particles contained in such powder is between about 3 and about 10 microns in diameter and the particles have a low specific surface are of about 0.2 $m^2$/gram. Zirconia surface deposits can be formed on such powder such that the zirconia accounts for about 0.25 percent of the weight of the coated particle.

During operation of the oxygen separator 1, the oxygen contained in oxygen containing feed stream 44 contacts the current collector layer 40 and permeates through pores thereof to the cathode layer 36 which as indicated above is also porous. The oxygen ionizes as a result of an electrical potential applied to the cathode and anode layers 34 and 36 at current collector layers 40 and 42. The resulting oxygen ions are transported through the electrolyte layer 38 under the driving force of applied potential and emerge at the side of the electrolyte layer 38 adjacent the anode layer 34 where electrons are gained to form elemental oxygen. The oxygen permeates through the pores of the anode layer 36 and the adjacent current collector 42 where the oxygen passes into the interior of the tubular membrane elements 14. The same function, in the same manner would be obtained for tubular membrane elements 16.

It is to be noted, that although the cathode layer is located on the outside of the tubular membrane elements 14 and 16, it is possible to reverse the layers so that the anode layer were located on the outside of the tubular membrane elements 14 and 16 and the cathode layer were located on the inside. Such an embodiment would be used where the device were used as a purifier. In such case the oxygen containing feed would flow on the inside of the tubular membrane elements 14.

Figure 5:
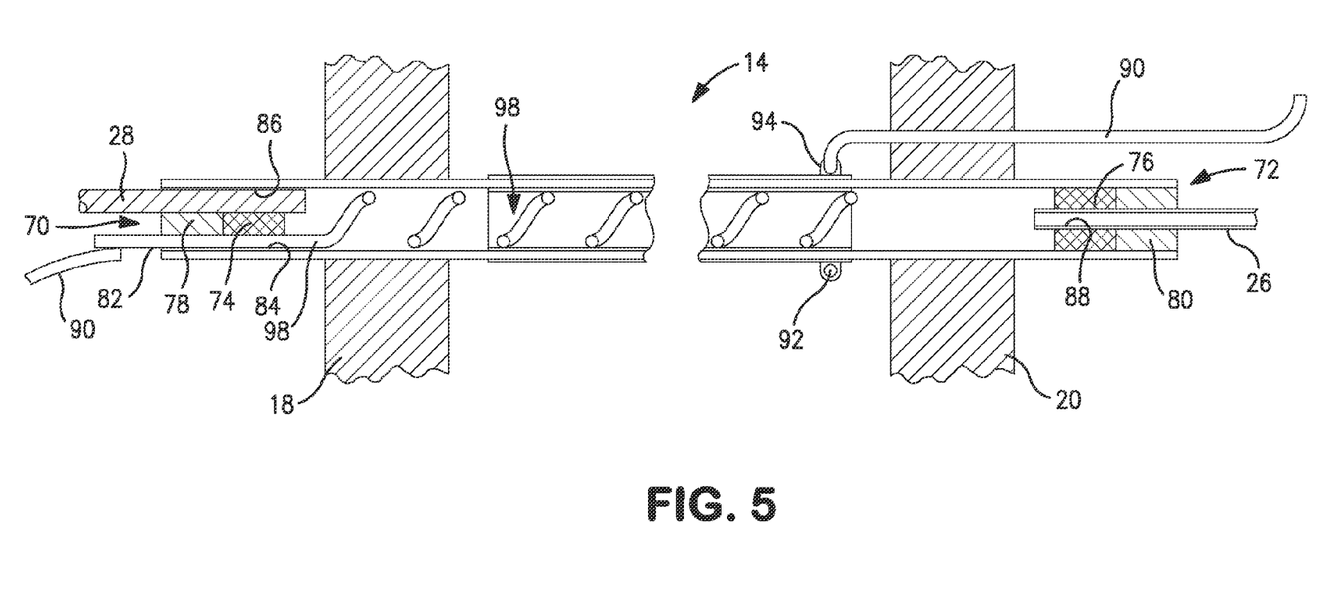
FIG. 5 is a schematic, sectional view of a tubular membrane element used in a module of the present invention.

With continued reference to FIG. 5, it can be seen that the outer, opposite end sections of each of the tubular membrane elements 14 are located within end insulation members 18 and 20. It is to be noted that the following discussion would have equal applicability to tubular membrane elements 16. As a result, there is essentially no oxygen transport taking place at such locations. As illustrated, the ends of each of the tubular membrane elements 14 are devoid of both the cathode layer 36 and its associated current collector 40 and the anode layer 34 and its associated current collector 42 so that current does not flow within the tubular membrane elements 14 at such locations. It has been found that where the tubular membrane elements are designed with electrical current flow within such insulated end section, the ceramic will tend to undergo a chemical reduction reaction at such end sections with a consequent potential of a failure of the elements. It is to be noted that embodiments of the present invention are possible in which the anode and cathode layers and their associated current collector layers extend to the physical ends of the tubular membrane elements 14 even when covered with an end insulation members.

Tubular membrane elements 14 and 16 incorporate end seals 70 and 72 formed at the opposite ends thereof. Each of the end seals 70 and 72 are formed by plug-like members 74 and 76 that are each fabricated from an elastomer to effect a hermetic seal at the ends of the tubular membrane elements 14 and 16. A suitable elastomer is a VITON® fluoroelastomer obtained through Dupont Performance Elastomers of Willmington, Del., United States of America.

During operation of tubular membrane elements 14 and 16 oxygen will accumulate and will tend to force the plug-like members 74 and 76 in an outward direction and from the ends of tubular membrane elements 14 and 16. In order to retain the plug-like members 74 and 76 within the end of tubular membrane elements 14 and 16, deposits of a ceramic adhesive 78 and 80 are introduced into the ends of tubular membrane elements 14 and 16 at a location adjacent to plug-like member 74 and plug-like member 76, respectively. A suitable ceramic adhesive can be a RESBOND™ 940 fast setting adhesive manufactured by Cotronics Corporation of Brooklyn, N.Y., United States of America. It is to be noted that other suitable means to retain plug-like member 74 and 76 could be employed such as mechanical keys located adjacent to plug-like member 74 that penetrate opposed transverse bores defined at the ends of tubular membrane elements 14 and 16 or sleeves cemented in place within the ends of tubular membrane elements 14 and 16.

As illustrated, an elongated element 28 penetrates the deposit 78 and the plug-like member 74 along with an electrical feed through 82 and an elongated elements 26 penetrates deposit 80 and plug-like member 76. In this regard an axial bore 84 and 86 are defined within plug-like member 74 for penetration of electrical feed through 82 and the second elongated element 28. An axial bore 88 is provided within plug-like member 76 for penetration of the elongated element 26.

In order to install plug-like members 74 and 76 within the end of tubular membrane elements 14 and 16, the same is fabricated with a larger outer diameter than the inner diameter of tubular membrane elements 14 and 16 and then cooled with liquid nitrogen. The percentage difference in diameters can be about 10 percent. Thereafter, plug-like members 74 and 76 are installed in the ends of tubular membrane elements 14 and 16 and as such members warm to ambient temperature, the same expands to produce a hermetic seal within the ends of tubular membrane element 14 and 16. Additionally, each of the bores 84, 86 and 88 are all sized smaller than the associated electrical feed through 82 and the elongated elements 28 and 26. After installation and warming of the plug-like members 74 and 76, the electrical feed through 84 and the elongated elements 28 and 26 are forced through the smaller bores to create hermetic seals. Thereafter, the ends are filled with the deposits of ceramic adhesive 78 and 80 to complete the end seals. As could be appreciated, other types of end seals are known in the art such as ceramic end caps and ceramic deposits within the tubes.

The potential is applied to each of the tubular membrane elements 14 and 16 by means of a connection to the current collector layer 42 adjacent of the cathode layer 34 by means of a conductor 90 that is looped around the current collector layer 42 by a loop 92 that is held in place by silver paste 94. Connection is established to current collector layer 40 adjacent the anode layer 36 by means of a conductor 90 that is attached to a current distributor 98 of helical configuration. Conductor 90 passes through the electrical feed through 82.

Although the tubular membrane elements 14 and 16 could be connected in parallel, preferably a series connection is established in which the current collector 40 of each of the tubular membrane elements 14 and 16 is connected to the current collector 42 of the next in series of the tubular membrane elements 14 and 16. Therefore, the current collector 40 of each particular first tubular membrane element 14 is connected to the current collector 42 of the second tubular membrane element 16 located directly adjacent thereto and the current collector 42 of the second tubular membrane element 16 is connected to the current collector elements 40 of the next, adjacent first tubular membrane element. Thus, as can best be seen in FIG. 3, the conductor 90 of each of the first tubular membrane elements 14 is connected to the end of the electrical feed through 82 of each of the adjacent second tubular membrane elements 16 and the conductor 90 passes through the second insulating member 20 for connection to such adjacent first tubular element 14 at loop 92 thereof. Since the first tubular membrane elements 16 and the second tubular membrane element 14 are reversed, at the first insulating member 18, the conductor 90 connects to the electrical feed through 82 of each of the first tubular membrane elements 14, passes through the first insulating member 18 and then is connected to the second tubular membrane elements 16 via the loop 92 thereof. This being said in case of two adjacent first and second tubular membrane elements 14 and 16, such connection between the elements as aforesaid is not established and instead, power cords 100 and 102 are connected to the electrical feed through 82 of the second tubular membrane element 16 and the current collector layer 42 of the first tubular membrane element 14 so that the electrical potential can be applied to the first and second tubular membrane elements 14 and 16.

With reference again to FIG. 1, the enclosure 12 has two opposite end walls 104 and 106 provided within opposite openings 108 and 110 within which the insulating members 18 and 20 are lodged with the ends of the first and second tubular membrane elements 14 and 16 exposed. The opposite end walls 104 and 106 are connected by a sidewall 112 thereby define a heated enclosure 114 that is heated by heating elements 116 embedded within the sidewall 112. Attached to the end walls 104 and 106 are inlet regions 120 and 122 defined by the interior of cowlings 124 and 126, respectively. Attached to the cowlings 124 and 126 are blowers 128 and 130, respectively, that direct feed air streams 44 and 44 to the inlet regions 120 and 122. With brief reference to FIG. 3, the insulating member 20 is provided with an opening in the form of an axial bore 136 that allows part of the feed air stream 44 to flow past the ends of the tubular membrane elements 14, 16 and thereby cool the ends and the deposits of elastomer that form the end seals before passing into the heated enclosure 114 and contact the first and second tubular membrane elements 14 and 16. Although not illustrated, insulating member 18 is provided with a like opening to allow at least a portion of the feed air stream 44 to flow past the exposed ends of the first and second tubular membrane elements 14 and 16 and into the heated enclosure 114 for the same purpose. The separation of the oxygen from the feed air streams 44 and 44 form a retentate that is discharged from the heated enclosure 114, through an exhaust 136 as a retentate stream 138.

As can be appreciated, embodiments of the present invention are possible in which in place of the axial bores or other openings within insulating members 18 and 20, openings could be situated within the end walls 104 and 106. The ends of the first and second tubular membrane elements 14 and 16 would not be cooled to the same extent as in the illustrated embodiment. Also, the openings in the insulating members, such as the illustrated insulating members 18 and 20 could be used in connection with an embodiment that did not have the first and second manifolds 22 and 24 of the present invention; or in other words, a single manifold collecting oxygen from all tubular membrane elements used in such embodiment.

With reference again to FIG. 2, oxygen product streams 140 and 142 are withdrawn from the first tubular elements 14 and the second tubular elements 16 by lines 144 and 146 connected to the collection elements 30 of second and first manifolds 24 and 22, respectively. Although not illustrated, the lines would pass through the cowlings 124 and 126 and then to a collection tank that would collect the oxygen product at pressure. As mentioned above, a central advantage of having the separate portions of the tubular membrane elements 14 and 16 is to prevent failure of the oxygen separation device 1 upon failure of a tubular membrane element. Moreover, where oxygen separation device 1 is used to supply oxygen to a tank under pressure, if a tubular membrane element failed, then product would be lost from the tank. In order to prevent this, check valves 148 and 150 are provided to isolate the first tubular membrane elements 14 from the second tubular membrane elements 16, respectively, and thereby to prevent the loss of pressurized product oxygen upon failure of a tubular membrane element of either of the two portions.

Although the present invention has been described with reference to a preferred embodiment, as will occur to those skilled in the art, numerous changes, additions and omission may be made without departing from the spirit and scope of the present invention as set forth in the appended claims.

We claim:

1. An electrically driven oxygen separation apparatus comprising:

an enclosure having two inlet regions, a heated interior region located between the inlet regions and having opposed end walls positioned adjacent the inlet regions, opposed openings defined in the end walls, a sidewall connecting the end walls, heating elements positioned to heat the heated interior region and an outlet extending from the heated interior region and through the sidewall;

at least one oxygen separation module, the oxygen separation module having a plurality of tubular membrane elements each of the tubular membrane elements having an anode layer, a cathode layer, an electrolyte layer located between the anode layer and the cathode layer and each of the tubular membrane elements configured to separate oxygen from an oxygen containing feed stream when an electric potential difference is applied between the anode layer and the cathode layer to induce oxygen ion transport in the electrolyte;

a power source electrically coupled to the plurality of tubular membrane elements to apply an electric potential difference between the anode layer and the cathode layer of each tubular membrane elements;

the at least one oxygen separation module further having a first manifold and a second manifold spaced apart from one another with the tubular membrane elements situated therebetween and configured to receive oxygen from the tubular membrane elements such that oxygen is received by the first manifold from a first group or portion of the tubular membrane elements and oxygen is received by the second manifold from a second group or portion of the tubular membrane elements;

the at least one oxygen separation module further having a plurality of end seals located at opposite ends of the tubular membrane elements and end insulation members located proximate end seals wherein the tubular membrane elements are arranged in a bundle and held in place by the end insulation members;

the at least one oxygen separation module positioned within the enclosure and with the end insulation members situated within the openings of the end walls and the opposed ends of the tubular membrane elements, the end seals and the manifolds projecting outwardly from the end insulation members and into the two inlet regions; and the at least one oxygen separation module further having one or more inlets located within the end insulation members to allow passage of oxygen containing feed streams from the inlet regions to the heated interior region.

2. The electrically driven oxygen separation apparatus of claim 1 further comprising one or more blowers connected to the inlet regions to circulate the oxygen containing feed stream into the inlet region, and past the end seals to cool the end seals, and through the inlets to contact the tubular membrane elements inside the heated enclosure.

3. The electrically driven oxygen separation apparatus of claim 1, wherein each of the first manifold and the second manifold has a collection element to collect the oxygen produced by the tubular membrane elements and first elongated elements and second elongated elements connected at one end to the collection element and at the other end penetrating the end seals of the tubular membrane elements; and wherein the first of the elongated elements are of tubular configuration to conduct the oxygen from the tubular membrane elements to the collection element and the second of the elongated elements are configured to prevent flow of the oxygen from the tubular membrane elements to the collection element; and wherein as between two adjacent tubular membrane elements, the oxygen flows from one of the two adjacent tubular membrane elements to the collection element of the first manifold and from the other of the two adjacent tubular membrane elements to the collection element of the second manifold.

4. The electrically driven oxygen separation apparatus of claim 3, wherein the second of the elongated elements are of solid configuration.

5. The electrically driven oxygen separation apparatus of claim 1, wherein the end seals comprise plug-like members located within the tubular membrane elements and formed by an elastomer to produce hermetic seals at the opposite ends of the tubular membrane elements and a deposits of a ceramic adhesive located within the tubular membrane elements adjacent to the plug-like members and positioned to prevent outward movement of the plug-like members.

6. The electrically driven oxygen separation apparatus of claim 1, wherein the tubular membrane elements are electrically connected in series and the tubular membrane elements contain current distributors of helical configuration in contact with one of the two current collector layers on the inside of the tubular membrane elements to conduct an electrical current from electrical conductors passing through the end seals via feed throughs.

* * * * *